(12) United States Patent
Tam

(10) Patent No.: US 8,013,301 B2
(45) Date of Patent: Sep. 6, 2011

(54) MEASUREMENT SYSTEM AND A METHOD

(75) Inventor: Aviram Tam, Nes Ziona (IL)

(73) Assignee: Applied Materials Israel, Ltd., Rehovot (IL)

(*) Notice: Subject to any disclaimer, the term of this patent is extended or adjusted under 35 U.S.C. 154(b) by 745 days.

(21) Appl. No.: 10/574,758

(22) PCT Filed: Oct. 7, 2004

(86) PCT No.: PCT/US2004/033113
§ 371 (c)(1),
(2), (4) Date: Jun. 20, 2008

(87) PCT Pub. No.: WO2005/036464
PCT Pub. Date: Apr. 21, 2005

(65) Prior Publication Data
US 2008/0290288 A1 Nov. 27, 2008

Related U.S. Application Data

(60) Provisional application No. 60/510,020, filed on Oct. 8, 2003.

(51) Int. Cl.
*G06T 7/60* (2006.01)
*H01J 37/28* (2006.01)
(52) U.S. Cl. ......... 250/310; 250/307; 382/145; 382/199
(58) Field of Classification Search .................. 250/310, 250/307; 382/145, 199
See application file for complete search history.

(56) References Cited

U.S. PATENT DOCUMENTS

| | | | |
|---|---|---|---|
| 6,470,230 B1 | 10/2002 | Toprac et al. | |
| 7,235,782 B2 | 6/2007 | Takane | |
| 2002/0028013 A1 | 3/2002 | Sawa et al. | |
| 2002/0110278 A1 | 8/2002 | Lee et al. | |
| 2003/0059104 A1 | 3/2003 | Mitsui | |
| 2003/0086616 A1 | 5/2003 | Oh et al. | |
| 2003/0126566 A1 | 7/2003 | Saito | |

FOREIGN PATENT DOCUMENTS

| | | |
|---|---|---|
| JP | 2002-50572 | 2/2002 |
| JP | 2002-328015 | 11/2002 |

OTHER PUBLICATIONS

Applied Materials Israel, Ltd.: P2008-534340, Japanese Office Action mailed Feb. 17, 2010, 2pp.
Applied Materials Israel, Ltd.: 200480032664.0, Chinese Office Action mailed Oct. 17, 2008, 6pp.
Bunday B.D. et al.: "CD-SEM Measurement of Line Edge Roughness Test Patterns for 193 nm Lithography"; Proceedings of the SPIE, SPIE, Bellingham, VA, U.S. ; vol. 5041, Jul. 2003, pp. 127-141.
PCT Notification of Transmittal of the International Search Report and the Written Opinion of the International Searching Authority, dated Apr. 27, 2006 for international application PCT/US2004/033113.
Applied Materials Israel, Ltd.: P2008-534340, Japanese Office Action mailed Jul. 13, 2010, 2pp.
Applied Materials Israel, Ltd.: 200480032664.0, Chinese Office Action mailed Feb. 2, 2010, 5pp.

*Primary Examiner* — Jack Berman
(74) *Attorney, Agent, or Firm* — SNR Denton US LLP

(57) ABSTRACT

The invention provides a method and a measurement system. The method includes: providing a measurement model that includes measurement image information; locating a measurement area image area by utilizing the measurement image information; and performing at least one measurement to provide measurement result information.

14 Claims, 4 Drawing Sheets

MEASUREMENT SYSTEM AND A METHOD

CROSS REFERENCES TO RELATED APPLICATIONS

The present patent application is a national phase application of International Application No. PCT/US2004/033113 filed Oct. 7, 2004, which claims priority benefit from U.S. Provisional Application 60/510,020 filed Oct. 8, 2003.

RELATED APPLICATIONS

This application claims the priority of U.S. provisional application Ser. No. 60/510,020 filed Oct. 8, 2003.

FIELD OF THE INVENTION

This invention relates to metrology systems and methods in determining features of sub-micron structural elements such as lines, contacts, trenches and the like, of measure structural elements such as but not limited to semiconductors wafers, reticles.

BACKGROUND OF THE INVENTION

Integrated circuits are very complex devices that include multiple layers. Each layer may include conductive material, isolating material while other layers may include semi-conductive materials. These various materials are arranged in patterns, usually in accordance with the expected functionality of the integrated circuit. The patterns also reflect the manufacturing process of the integrated circuits.

Integrated circuits are manufactured by complex multi-staged manufacturing processes. During this multi-staged process resistive material is (i) deposited on a substrate/layer, (ii) exposed by a photolithographic process, and (iii) developed to produce a pattern that defines some areas to be later etched.

Various metrology, inspection and failure analysis techniques evolved for inspecting integrated circuits both during the fabrication stages, between consecutive manufacturing stages, either in combination with the manufacturing process (also termed "in line" inspection techniques) or not (also termed "off line" inspection techniques). Various optical as well as charged particle beam inspection tools and review tools are known in the art, such as the VeraSEM™, Compluss™ and SEMVision™ of Applied Materials Inc. of Santa Clara, Calif.

Manufacturing failures may affect the electrical characteristics of the integrated circuits. Some of these failures result from unwanted deviations from the required dimensions of the patterns. A "critical dimension" is usually the width of a patterned line, the distance between two patterned lines, the width of a contact and the like.

One of the goals of metrology is to determine whether the inspected structural elements include deviations from these critical dimensions. This inspection is usually done by charged particles beam imaging that provide the high resolution required to measure said deviations.

A typical measured structural element is a line that has two opposing sidewalls. The measurement of the bottom width of the line involves measuring the top width of the line as well as measuring its sidewalls. Another typical measured structural element is a contact or a hole to be filled with conductive materials. Said structural element is also referred to as via. Vias are usually elliptical or round.

A typical measurement process has multiple stages, including locating a certain feature, scanning the feature to provide an image, processing the image to locate edges and measuring critical dimensions based upon the relative location of the edges. There is a growing need to improve the measurement process.

SUMMARY OF THE INVENTION

The invention provides a method that includes: providing a measurement model that includes measurement image information; locating a measurement area by utilizing the measurement image information; and performing at least one measurement to provide measurement result information.

The invention provides a measurement system that includes: (i) a scanner for scanning an measurement area with a beam of charged particles; (ii) a detector, positioned to receive charged particles resulting from an interaction between the measurement area and the beam of charged particles and to provide multiple detection signals; and (iii) a processor, adapted to process detection signals and to control the scanner; wherein the measurement system is adapted to receive a measurement model that includes measurement image information; to locate a measurement area by utilizing the measurement image information; and to perform at least one measurement to provide measurement result information. According to another embodiment of the invention the measurement system is adapted to generate the measurement model.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE DRAWINGS

Figure 1:
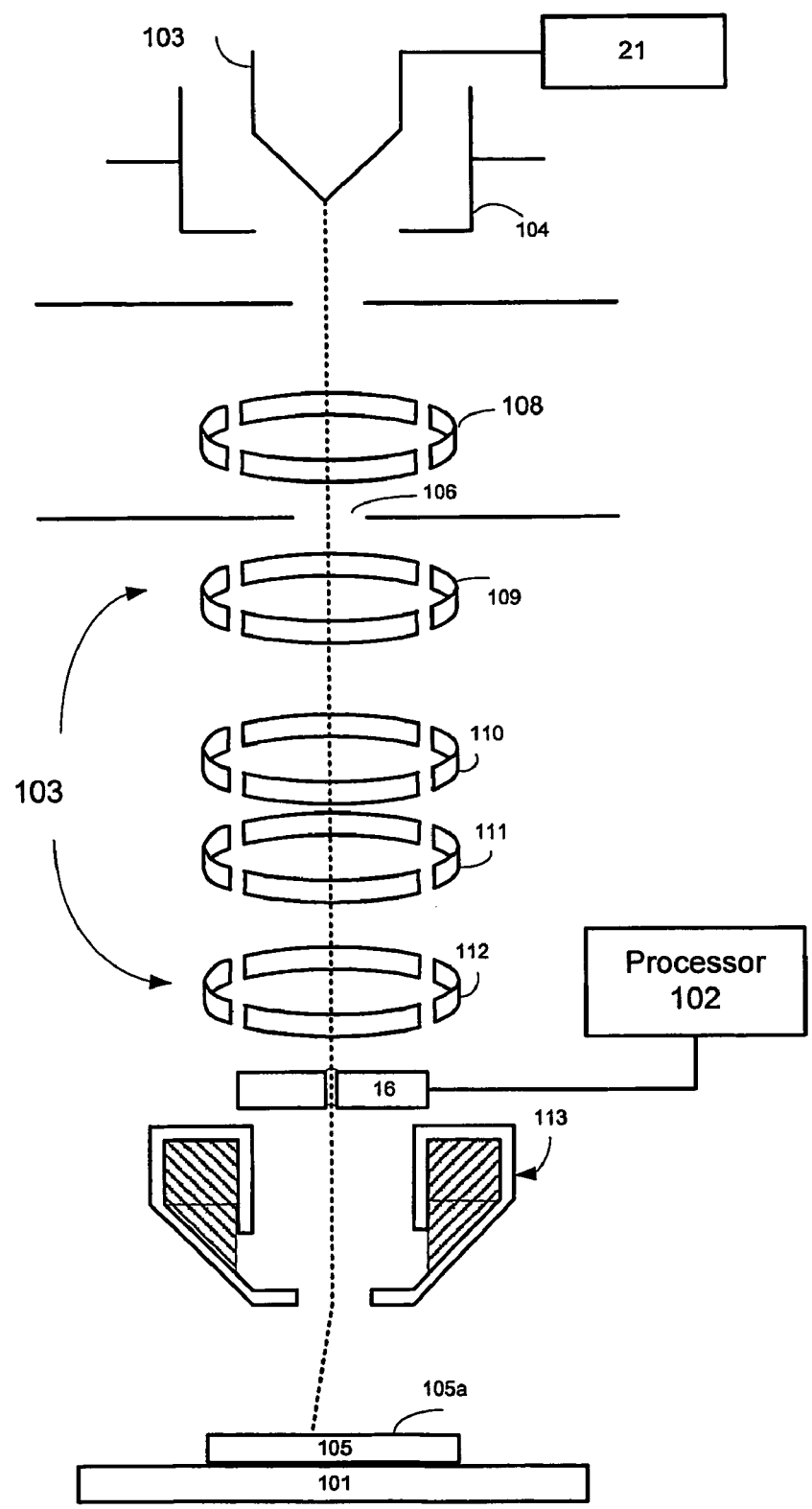
FIG. 1 is a schematic illustration of a critical dimension scanning electron microscope, in accordance with an embodiment of the invention.

Measurement of features of one or more certain structural elements, especially but not limited to, within an area that includes multiple ideally identical structural elements usually includes a stage of locating these one or more certain structural elements. This stage is important to enhance the repeatability of the measurement.

Typically, these certain structural elements are characterized by a certain displacement from a certain target within a first area. The coordinates of the target are known but due to mechanical and other inaccuracies of the measurement system on one hand and the constantly shrinking structural elements on the other hand, the target has to be located by image processing stages. Typically, the target is selected such that both the target and the certain structural element can be viewed by the measurement system without introducing a mechanical movement. The mechanical inaccuracies can be reduced by using relatively accurate control means such as interferometers. Said control means can be used instead of a target based location scheme or in addition to such a target based location scheme.

Nevertheless, even this stage of locating a target and then deflecting an electron beam to scan a certain target positioned at a certain displacement from the target cannot always provide the required accuracy, due to the dramatic decrement in the size of structural elements.

According to an embodiment of the invention a measurement model is provided. This measurement model includes a measurement area image information that can include one or more expected images of a measurement area (reference measurement image) or one or more representations of said measurement image (reference measurement image representation). Once the vicinity of these one or more certain structural elements is found (for example by locating a target and introducing a predefined displacement) it is scanned to provide an image of a vicinity area that is processed to locate the measurement area. The vicinity area is defined in response to the measurement area and displacement inaccuracies introduced during the location of the one or more certain structural elements.

Usually the measurement model includes a single reference measurement image or a single reference measurement image representation. Most of the following description refers to such a scenario. It is noted that this is not necessarily so. According to various embodiments of the invention the measurement model can provide multiple reference measurement images and/or multiple reference measurement images representations and the method can include selecting between said images, either before the stage of locating the measurement area, during said process or after the process.

A selection can be responsive to a match between a reference measurement image (or a representation of such an image) and the scanned image of a located measurement area. This can be useful when Focus Exposure Matrix wafers are scanned or when OPC are developed.

According to various embodiments of the invention alternative edge information and/or alternative measurement information can be included within the measurement model.

Alternative measurement information can be associated with alternative reference measurement image (or a representation of such an image) but this is not necessarily so. For example, alternative measurements can be executed in response to various factors including, such as but not limited to an amount (or degree) of match (or correlation) between a reference measurement image and the image of the measurement area (that is being located).

According to another embodiment of the invention the amount of correlation (or match) between a reference measurement image and the located measurement area is provided to a user, stored or otherwise processed.

The selection between said alternatives can be responsive from a selection of a reference measurement image (or representation of such an image).

According to another embodiment of the invention the measurement model includes edge information representative of the edges of the one or more structural elements. This edge information is used as a reference that aids in locating edges within the measurement area, using SEM imaging, thus greatly simplifying the edge detection within the measurement area. Typically, edge detection within an area is relatively complex and is resource consuming. By providing the edge information the process is simplified and can be executed relatively quickly.

According to another embodiment of the invention the measurement model also includes measurement information representative of the measurement to be done. For example the measurements can include determining the critical dimension of one of the structural elements, determining a relationship between one or more structural elements, providing a statistical indication about multiple structural elements, and the like.

The following figures include various examples of a measurement system, a method and various images and are for descriptive purposes only. The following figures do not intend to limit the scope of the invention.

FIG. 1 illustrates a measurement system such as SEM 100, according to an embodiment of the invention.

A typical CD-SEM includes an electron gun, for generating an electron beam, deflection and tilt units as well as focusing lens, for enabling scanning of a specimen with an electron beam, that may be in a certain tilt condition, while reducing various aberrations and misalignments. Electrons, such as secondary electrons that are emitted as result of an interaction between the specimen and the electron beam are attracted to a detector that provides detection signals that are processed by a processing unit. The detection signals may be used to determine various features of the specimen, as well as form images of the inspected specimen.

The invention may be implemented on CD-SEMs of various architectures that may differ from each other by the amount of their parts as well as the arrangement of said parts. For example the amount of deflection units, as well as the exact structure of each unit may vary. The CD-SEM may include in-lens as well as out of lens detectors or a combination of both.

A measurement system such as CD-SEM 100 is illustrated in FIG. 1. The CD-SEM 100 includes: (i) a scanner, such as scanning deflection unit 103, for scanning an area that comprises multiple structural elements with a beam of charged particles; (ii) a detector, such as in-lens detector 16, positioned to receive charged particles resulting from an interaction between the area and the beam of charged particles and to provide multiple detection signals; and (iii) a processor, such as processor 102, that is adapted to process detection signals and to make use of the measurement model. Conveniently, processor 102 is also capable of generating the measurement model, or to receive said model from another device.

CD-SEM 100 further includes: (a) an electron gun 103 emitting an electron beam 101, which is extracted by the anode 104, (b) an objective lens 113 that focuses the electron beam on a surface 105a of an inspected object 105, (c) deflection units 108-112, and (d) a stage 101 for introducing a relative mechanical movement between the object 105 and the objective lens 112 113.

The beam is scanned over the specimen using the scanning deflection unit 103. An alignment of the beam to the aperture 106 or a desired optical axis respectively can be achieved by the deflection units 108 to 112. As a deflection unit, coils, electrostatic modules in the form of charged plates or a combination of coils and electrostatic deflectors can be used.

In-lens detector 16 is able to detect secondary electrons that escape from the object 105 at a variety of angles with relatively low energy (3 to 50 eV). Measurements of scattered or secondary corpuscles from a specimen can be conducted with detectors in the form of scintillators connected to photomultiplier tubes or the like. Since the way of measuring the signals does not influence the inventive idea in general, this is not to be understood as limiting the invention. It is noted that the CD-SEM may include, additionally or alternatively, at least one out of lens detector.

Detection signals are processed by processor 102 that may also be adapted to control the parts of CD-SEM 100 and coordinate their operation. Conveniently, processor 102 has image processing capabilities and is able to process the detection signals in various manners. A typical processing scheme includes generating a waveform that reflects the amplitude of the detection signal versus the scan direction. The waveform is further processed to generate an image, to determine locations of at least one edge, and other cross sectional features of inspected structural elements.

The different parts of the system are connected to corresponding supply units (such as high voltage supply unit 21) that are controlled by various control units, most of them omitted from the figure for simplifying the explanation. The control units may determine the current supplied to a certain part, as well as the voltage.

CD-SEM 100 includes a double deflection system that includes deflection units 111 and 112. Thus, the beam tilt introduced in the first deflection unit 111, can be corrected for in the second deflection unit 112. Due to this double deflection system, the electron beam can be shifted in one direction without introducing a beam tilt of the electron beam with respect to the optical axis.

Modem CD-SEMs are able to measure structural elements that have cross sections that have sub-micron dimensions, with an accuracy of several nanometers. The size of these cross sections is expected to reduce in the future, as manufacturing and inspection processes continue to improve.

Various features of the cross section may be of interest. These feature may include, for example: the shape of the cross section, the shape of one or more sections of the cross section, the width and/or height and/or angular orientation of the cross section sections, as well as the relationship between cross section sections. The feature can reflect typical values, as well as maximal and/or minimal values. Typically the width of the bottom of a line is of interest, but this is not necessarily so and other features may be of interest.

Figure 2:
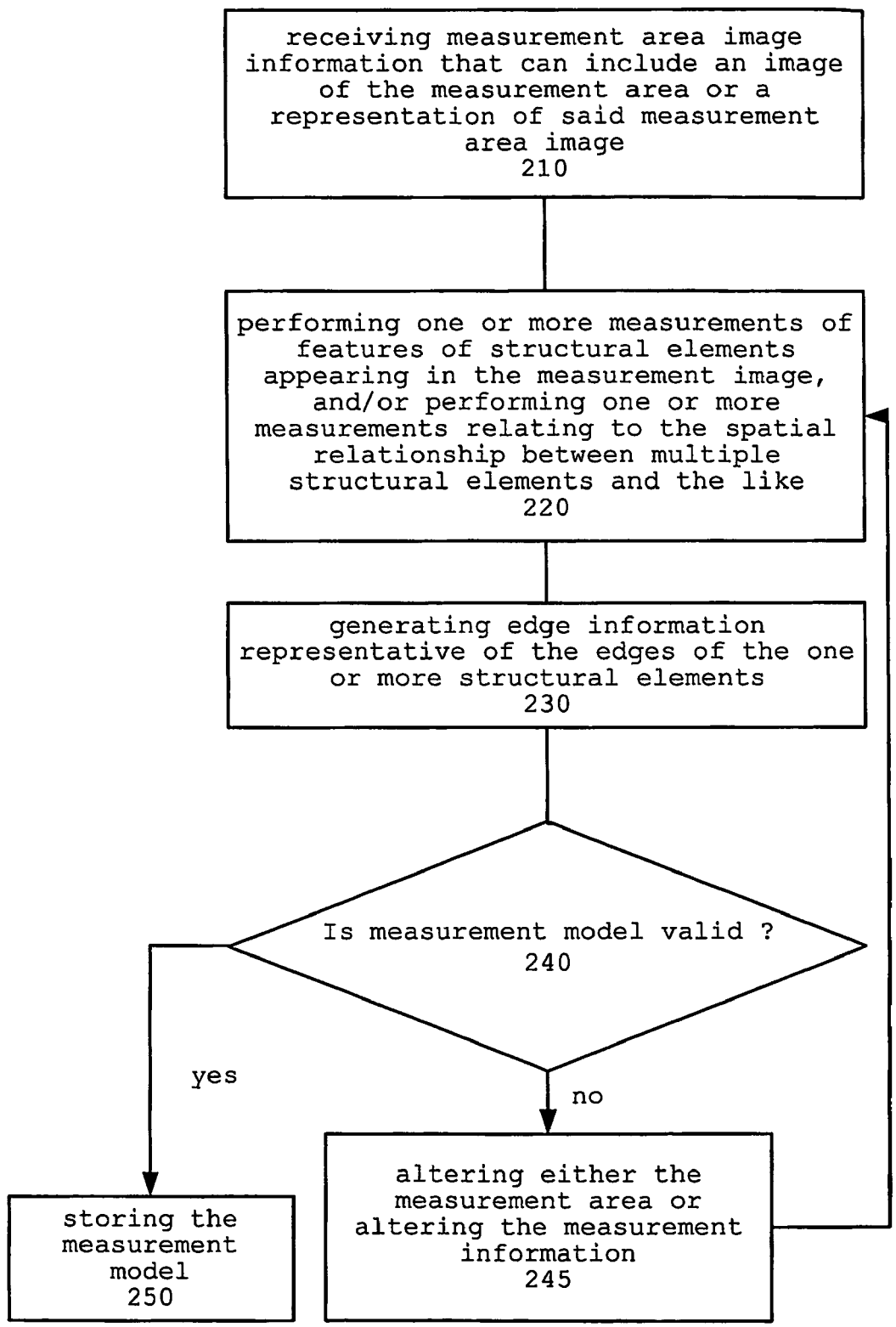
FIGS. 2 and 3 are flow charts of a process and a method, according to various embodiments of the invention.

FIG. 2 illustrates a process 200 of generating a measurement model, according to various embodiments of the invention.

Process 200 starts by stage 210 of receiving measurement area image information that can include an image of the measurement area or a representation of said measurement area image. This image can be a SEM image, a representation of a SEM image, an image generated by processing EDA information (such as a CAD file, CAD record and the like) of a wafer or even of a reticle (mask), and the like. The CAD file (also referred to as the CAD generated image) may be a simple bitmap containing the CAD data or a simulation of the image of a wafer that would be produced from said CAD file. According to an embodiment of the invention stage 210 may include generating such an image in response to received information such as CAD information and the like. The image is usually stored in a computer readable format, so as to allow retrieval of the image and a comparison of said image to measured images.

Conveniently, the measurement model includes the measurement area image or a representation of the measurement area image.

Stage 210 is followed by stage 220 of performing one or more measurements of features of structural elements appearing in the measurement image, and/or performing one or more measurements relating to the spatial relationship between multiple structural elements and the like. These measurements can be dictated by predefined measurement information provided to the process. According to another embodiment the measurement information and accordingly the measurement to be performed can be dynamically updated during process 200.

Conveniently, the measurement model includes the result of these measurements (referred to as reference measurement results). Additionally or alternatively, the measurement model can include the measurement information.

Conveniently, stage 220 is followed by stage 230 of generating edge information representative of the edges of the one or more structural elements. This information can include the coordinates of pixels that form an edge, a mathematical representation of an edge of a structural element or a mathematical representation of an edge of a portion of said structural element, and the like.

Conveniently, the measurement model includes the edge information.

According to an embodiment of the invention process 200 allows dynamically altering the measurement model in response to one or more criteria. Accordingly, stage 230 is followed by query stage 240 of determining if the measurement model fulfills these one or more criteria. Conveniently, the measurement model is valid if all the required measurements defined in the measurement information were successfully completed. If the measurement model is valid then stage 240 is followed by stage 250 of storing the measurement model or merely defining it as a measurement model.

If the measurement model is not valid (it did not fulfill the one or more criteria) then query stage 240 is followed by stage 245 of altering either the measurement area or altering the measurement information thus changing the required measurements. Stage 245 is followed by stage 220.

Figure 3:
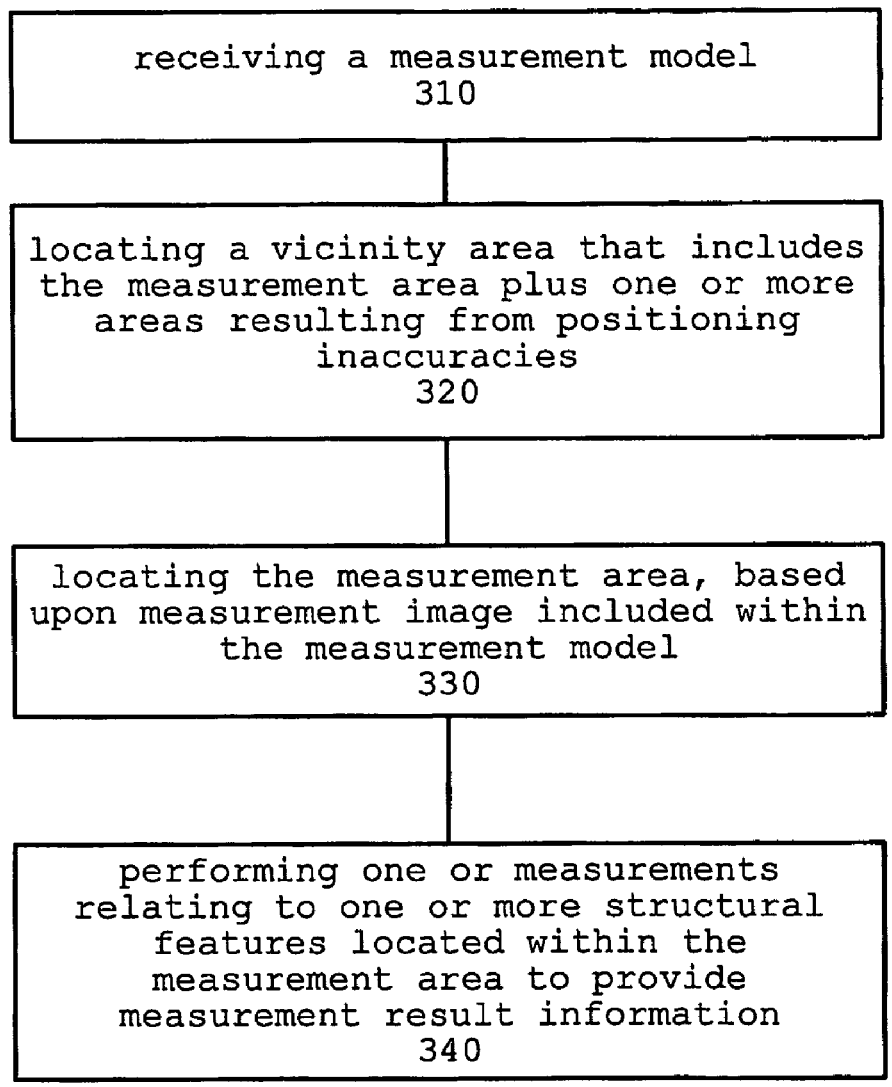

FIG. 3 is a flow chart of a method 300 according to an embodiment of the invention. Method 300 utilizes a measurement model.

It is noted that the same system that applies method 300 can also generate the measurement model, for example by applying process 200, but this is not necessarily so. It is further noted that the measurement model can be updated in response to the results gained during method 300.

Method 300 starts by stage 310 of receiving a measurement model.

Stage 310 is followed by stage 320 of locating a vicinity area that includes the measurement area plus one or more areas resulting from positioning inaccuracies. Stage 320 can be applied by various prior art methods including defining a target, directing a scanning electron beam to the vicinity of the target and detecting the target, displacing the scanning electron beam by a predefined displacement to arrive to the vicinity area.

Stage 320 is followed by stage 330 of locating the measurement area, based upon measurement image information of the measurement model.

Stage 330 is followed by stage 340 of performing one or measurements relating to one or more structural features located within the measurement area to provide measurement result information. Conveniently these measurements are defined by measurement information within the measurement model.

The measurement result information can indicate a shape of a structural element, a certain feature of that structural element, a relationship between adjacent or distant structural elements, statistical information reflecting one or multiple structural elements and the like. For example if a contact hole is measured it shape is supposed to be elliptical and a measurement result can reflect deviations from said ellipse, area of the ellipse, length of one or both of the contact hole axis, the orientation of the ellipse and the like.

According to an embodiment of the invention stage 340 includes using edge information to locate edges of structural features within the measurement area. For example, edges can be searched in proximity of reference edges defined in the edge information. The edge can be detected by locating a maximal gradient value at the vicinity of the reference edges, but this is not necessarily so.

According to yet another embodiment of the invention stage 340 may include processing measurements in response to reference measurement results within the measurement model.

The use of the measurement model can allow monitoring deviations from a design, since it can contain the design layout, which can be compared to the actual layout on the wafer.

The measurement information can include a definition of various measurements that may be performed on different sections of the measurement image, which previously required several scans, thus improving throughput and reducing scan effects on the measurement (such as carbonization, photo-resist shrinkage and the like).

Using the measurement model can ease a transfer of designer measurement requirements from the CAD to the CD-SEM.

Figure 4:
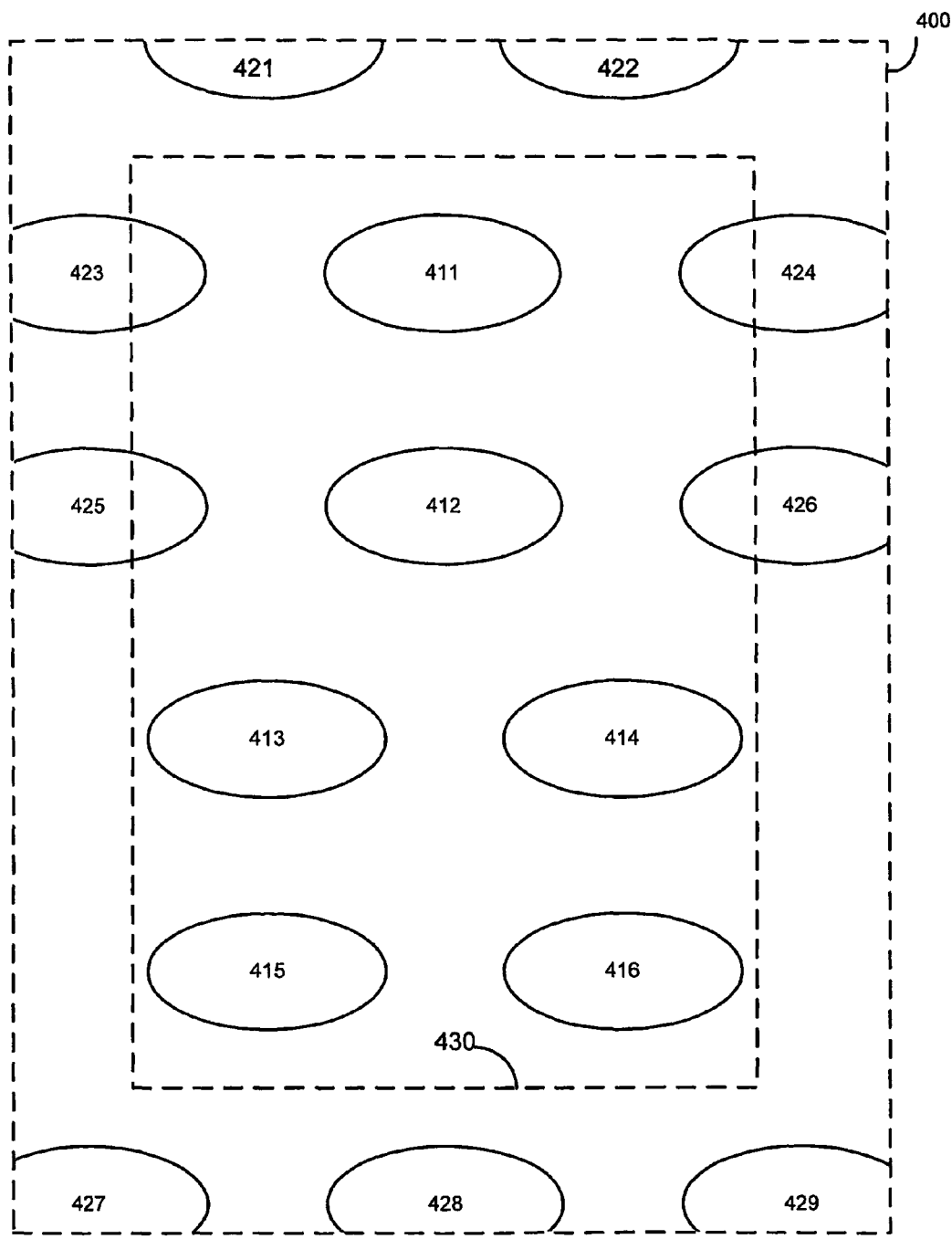
FIG. 4 is an exemplary image of a vicinity area and a measurement area.

FIG. 4 illustrates an exemplary vicinity area 400 that includes multiple vias 411-416 and multiple via portions 421-429, according to an embodiment of the invention.

The vicinity area 400 includes a measurement area 430 that includes the multiple vias 411-416. It is noted that each area can include a single structural element, a combination of structural elements and structural element portions, one or more structural element portions and the like.

The difference between the vicinity area 400 and the measurement area 430 reflects positioning inaccuracies.

The measurement information can include measuring a feature of one or more vias out of 411-416, a distance between said vias, a relative orientation between vias and the like. The edge information can include information representative of the location of the edges of vias 411-416 and even of portions of one or more vias 423-429 that are partially included within measurement area 430.

The present invention can be practiced by employing conventional tools, methodology and components. Accordingly, the details of such tools, component and methodology are not set forth herein in detail. In the previous descriptions, numerous specific details are set forth, such as shapes of cross sections of typical lines, amount of deflection units, etc., in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:

1. A method, comprising:
    receiving, by a measurement system, a measurement model for a measurement area of a sample, said measurement model comprising measurement image information, reference measurement information representative of measurements to be made using the measurement model and edge information;
    locating, by the measurement system, the measurement area of the sample by (i) locating a vicinity area that includes the measurement area of the sample by detecting a target and then displacing a scanning beam from the target by a predefined displacement amount, and (ii) locating the measurement area of the sample within the vicinity area by applying image processing utilizing the measurement image information of the measurement model;
    locating, by the measurement system, edges of structural features within the measurement area of the sample by searching in a proximity of reference edges defined in the edge information;
    performing, by the measurement system, at least one measurement of the measurement area of the sample based on the located edges of the structural features and the reference measurement information included in the measurement model; and
    providing, by the measurement system, measurement result information to a user.

2. The method of claim 1 wherein the performing of the at least one measurement comprises measuring at least one feature of at least one structural element within the measurement area of the sample.

3. The method of claim 1 wherein the performing of the at least one measurement comprises measuring a relationship between multiple structural elements within the measurement area of the sample.

4. The method of claim 1 further comprising generating the measurement image information from an SEM image.

5. The method of claim 1 further comprising generating the measurement image information from CAD information.

6. The method of claim 1 further comprising repeatedly generating the measurement model until one or more criteria are fulfilled.

7. A system comprising:
    a processor, wherein the processor is enabled to:
        generate or receive a measurement model for a measurement area of a sample, said measurement model comprising measurement image information, reference measurement information representative of measurements to be made using the measurement model and edge information,
        locate the target measurement area of the sample by (i) locating a vicinity area that includes the measurement area of the sample by detecting a target and then displacing a scanning beam of the scanner from the target by a predefined displacement amount, and (ii) locating the measurement area of the sample within the vicinity area by applying image processing utilizing the measurement image information of the measurement model,
        locate edges of structural features within the measurement area of the sample by searching in a proximity of reference edges defined in the edge information,
        perform at least one measurement of the measurement area of the sample based on the located edges of the structural features and the reference measurement information included in the measurement model,
        control the scanner, and
        process multiple detection signals received from a detector;
    the scanner, in communication with the processor, wherein the scanner is enabled to scan the measurement area of the sample with the scanning beam; and
    the detector, in communication with the processor, wherein the detector is positioned to receive charged particles resulting from an interaction between the measurement area of the sample and the scanning beam and is enabled to provide the multiple detection signals, based on the received charged particles, to the processor.

8. The system of claim 7 wherein the processor is further enabled to perform at least one measurement of at least one feature of at least one structural element within the measurement area of the sample.

9. The system of claim 7 wherein the detector is further enabled to detect a relationship between multiple structural elements within the measurement area of the sample.

10. A system comprising:
a processor, wherein the processor is enabled to:
    generate a measurement model for a measurement area of a sample, said measurement model comprising measurement image information, reference measurement information representative of measurements to be made using the measurement model and edge information,
    locate the measurement area of the sample by (i) locating a vicinity area that includes the measurement area of the sample by detecting a target and then displacing a scanning beam of a scanner from the target by a predefined displacement amount, and (ii) locating the measurement area of the sample within the vicinity area by applying image processing utilizing the measurement image information of the measurement model,
    locate edges of structural features within the measurement area of the sample by searching in a proximity of reference edges defined in the edge information,
    perform at least one measurement of the measurement area of the sample based on the located edges of the structural features and the reference measurement information included in the measurement model,
    control the scanner, and
    process multiple detection signals received from a detector;
the scanner, in communication with the processor, wherein the scanner is enabled to scan the measurement area of the sample with the scanning beam; and
the detector, in communication with the processor, wherein the detector is positioned to receive charged particles resulting from an interaction between the measurement area of the sample and the scanning beam and is enabled to provide the multiple detection signals, based on the received charged particles, to the processor.

11. The system of claim 10 wherein the processor is further enabled to generate the measurement image information from an SEM image.

12. The system of claim 10 wherein the processor is further enabled to generate the measurement image information from CAD information.

13. The system of claim 10 wherein the processor is further enabled to perform at least one measurement of at least one feature of at least one structural element within the measurement area of the sample.

14. The system of claim 10 wherein the detector is further enabled to detect a relationship between multiple structural elements within the measurement area of the sample.

* * * * *